M. LEITCH.
LUBRICATING MEANS FOR CENTRIFUGAL SEPARATORS.
APPLICATION FILED MAR. 22, 1918.
1,305,813.
Patented June 3, 1919.
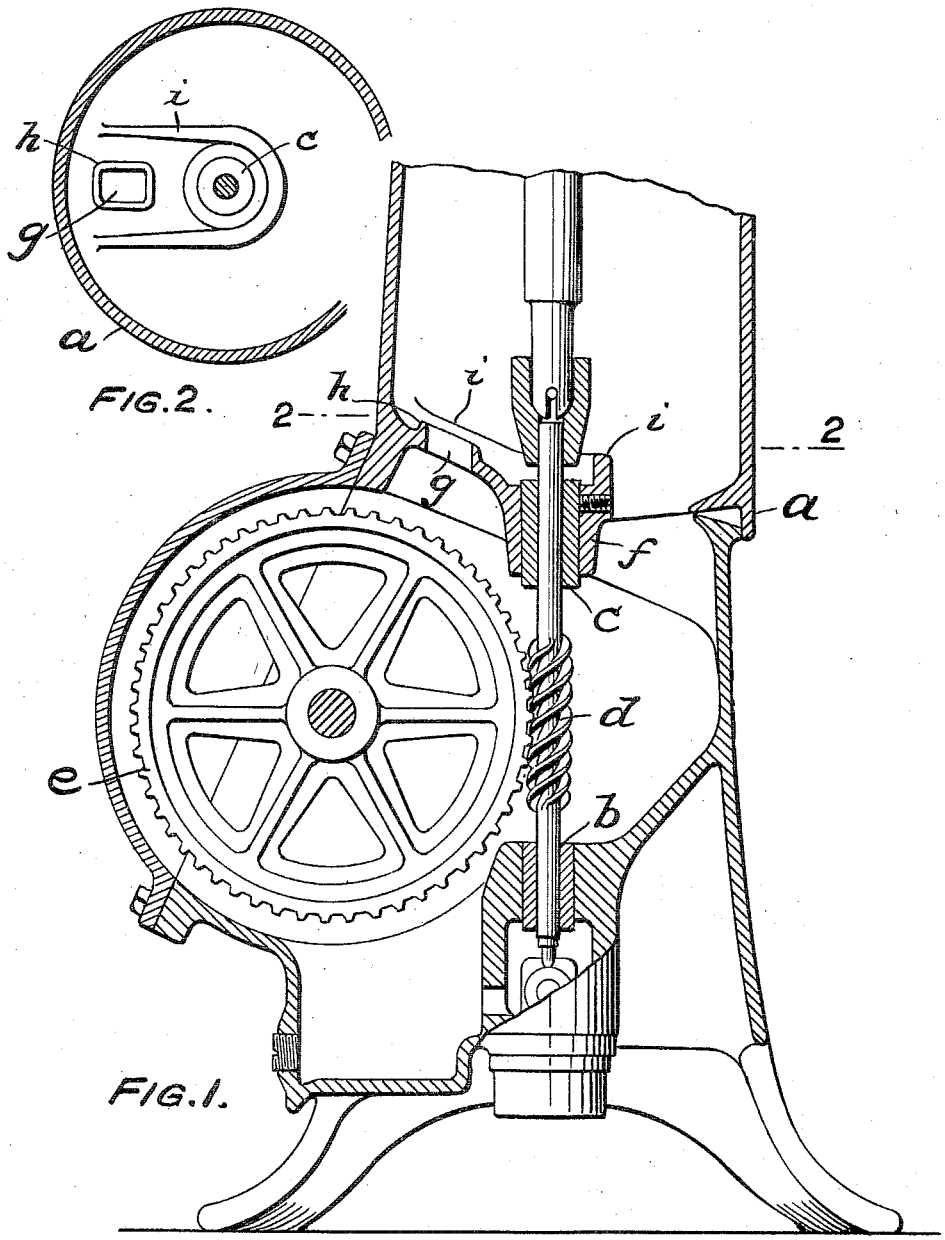
WITNESS:
Robt R Ketchel
INVENTOR
Meredith Leitch
BY
Frank P Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

LUBRICATING MEANS FOR CENTRIFUGAL SEPARATORS.

1,305,813.           Specification of Letters Patent.     Patented June 3, 1919.

Application filed March 22, 1918. Serial No. 224,088.

*To all whom it may concern:*

Be it known that I, MEREDITH LEITCH, a citizen of the United States, residing at Poughkeepsie, county of Dutchess, and State of New York, have invented a new and useful Improvement in Lubricating Means for Centrifugal Separators, of which the following is a full, clear, and exact description, reference being had to the accompanying drawings, which form a part of this specification.

My invention relates to centrifugal separators containing a splash lubricating system and has for its object the provision of means to insure a plentiful supply of oil, by splash lubrication, to the upper bearing for the vertical worm shaft. In such splash lubricating systems, enough oil is placed in the lower part of the frame to allow the worm-wheel to dip into it and splash oil generally around the inside of the gearing inclosure and to provide channels to carry oil to bearings; my invention, however, contemplating the conveyance of a portion of such splashed oil to a bearing which has not heretofore been so lubricated and comprising means exhibiting general and specific novelty whereby the proper lubrication of such bearing is effected.

In the drawings: Figure 1 is a vertical section through the driving mechanism of a centrifugal separator embodying my invention. Fig. 2 is a plan view of a detail.

The frame $a$ has a lower bearing $b$ and upper bearing $c$ for a vertical worm $d$. The frame has two other bearings in which turns a horizontal shaft carrying a worm-wheel $e$ which meshes with the worm $d$. The frame is shaped to form a splash-lubricating inclosure for the worm and worm-wheel. Above the worm-wheel the frame comprises a member $f$ which supports the upper bearing $c$, this member extending backward to form a diaphragm or trough through which there is formed an oil opening $g$. The opening $g$ is in the plane of the worm-wheel and tangential to the worm-wheel rim and is surrounded by a raised curb $h$. Above and spaced from the curb $h$ to allow a channel between is a fence $i$ which extends along the top of the diaphragm $f$ and around the top of the bearing $c$, thereby forming an oil cistern or reservoir to feed the bearing.

When in operation, the worm-wheel $e$ runs upward at the side meshing with the worm $d$. Some of the oil adhering to the rim of the wheel is thrown off in an upward tangential direction, flies through the opening $g$, strikes against the back of the frame and runs down. The curb $h$ prevents the oil reëntering the opening $g$. It therefore runs around the curb and is led by the fence $i$ into the oil cistern or reservoir around the top of the bearing $c$.

Having now fully described my invention, what I claim and desire to protect by Letters Patent is:

1. In a centrifugal separator, the combination of an upright shaft and a worm thereon, a horizontal shaft and a worm-wheel thereon meshing with the worm, upper and lower bearings for the upright shaft, and a member above the worm wheel having an upper surface inclined toward and leading to the upper bearing and provided with an oil opening positioned in the plane of the worm-wheel and through which oil splashed by the worm wheel is delivered to said inclined surface.

2. In a centrifugal separator, the combination of an upright shaft and a worm thereon, a horizontal shaft and a worm-wheel thereon meshing with the worm, upper and lower bearings for the upright shaft, a member above the worm wheel having an upper surface inclined toward the upper bearing and provided with an oil opening positioned in the plane of the worm-wheel and through which oil splashed by the worm wheel is delivered to said inclined surface, and a curb extending above said surface adjacent to said opening to prevent oil delivered through said opening onto said surface from reëntering the opening.

3. In a centrifugal separator, the combination of an upright shaft and a worm thereon, a horizontal shaft and a worm-wheel thereon meshing with the worm, upper and lower bearings for the upright shaft, a member above the worm-wheel provided with an oil receiving opening and having an upper surface inclining downward from said opening toward said upper bearing, and means upstanding from said surface to prevent the oil returning through the opening and guide it toward said upper bearing.

4. In a centrifugal separator, the combination of an upright shaft and a worm thereon, a horizontal shaft and a worm-wheel thereon meshing with the worm, upper and lower bearings for the upright shaft, a member above the worm-wheel and supporting the upper bearing and having through it, in the plane of the worm-wheel, an oil opening, a curb around the opening, and an oil channel from the space adjacent the curb to the upper bearing.

5. In a centrifugal separator, the combination of an upright shaft and a worm thereon, a horizontal shaft and a worm-wheel thereon meshing with the worm, upper and lower bearings for the upright shaft, a member above the worm-wheel and supporting the upper bearing and having through it, in the plane of the worm-wheel, an oil opening, and a fence extending along the top of said member and around the top of the upper bearing and there forming an oil cistern to receive the oil conveyed from the space adjacent the curb along said member.

6. In a centrifugal separator, the combination of an upright shaft and a worm thereon, a horizontal shaft and a worm-wheel thereon meshing with the worm, upper and lower bearings for the upright shaft, a member above the worm-wheel and supporting the upper bearing and having through it, in the plane of the worm-wheel, an oil opening, a curb around the oil opening and, on the upper side of the member, a fence around the oil opening and the bearing, the edges of said curb and said fence being higher than the top of the bearing.

7. In a centrifugal separator, the combination of an upright shaft and a worm thereon, a horizontal shaft and a worm-wheel thereon meshing with the worm, upper and lower bearings for the upright shaft, a member above the worm-wheel and supporting the upper bearing and having through it, in the plane of the worm-wheel, an oil opening, and a curb around the oil opening higher than the top of the bearing, the opening and bearing being surrounded by portions of the member, other than the curb, higher than the top of the bearing.

8. In a centrifugal separator, the combination of an upright shaft and a worm thereon, a horizontal shaft and a worm-wheel thereon meshing with the worm, upper and lower bearings for the upright shaft, a member above the worm-wheel and supporting the upper bearing and having through it, in the plane of the worm-wheel, an oil opening, a curb adjacent the opening, and a fence extending along the top of said member and around the top of the upper bearing and there forming an oil cistern to receive the oil conveyed from the space adjacent the curb along said member.

In testimony of which invention, I have hereunto set my hand, at Poughkeepsie, N. Y., on this 19th day of March, 1918.

MEREDITH LEITCH.